US012420192B2

(12) United States Patent
Villanueva Aylagas et al.

(10) Patent No.: US 12,420,192 B2
(45) Date of Patent: Sep. 23, 2025

(54) NEURAL SYNTHESIS OF SOUND EFFECTS USING DEEP GENERATIVE MODELS

(71) Applicant: Electronic Arts Inc., Redwood City, CA (US)

(72) Inventors: Monica Villanueva Aylagas, Sundbyberg (SE); Albin Jansson, Stockholm (SE); Sergi Andreu, Barcelona (ES)

(73) Assignee: ELECTRONIC ARTS INC., Redwood City, CA (US)

( * ) Notice: Subject to any disclaimer, the term of this patent is extended or adjusted under 35 U.S.C. 154(b) by 284 days.

(21) Appl. No.: 18/106,335

(22) Filed: Feb. 6, 2023

(65) Prior Publication Data

US 2023/0390642 A1   Dec. 7, 2023

Related U.S. Application Data

(60) Provisional application No. 63/359,467, filed on Jul. 8, 2022, provisional application No. 63/348,292, filed on Jun. 2, 2022.

(51) Int. Cl.
*A63F 13/54* (2014.01)
*G06N 3/0475* (2023.01)
*G06N 3/08* (2023.01)

(52) U.S. Cl.
CPC ........... *A63F 13/54* (2014.09); *G06N 3/0475* (2023.01); *G06N 3/08* (2013.01); *A63F 2300/6063* (2013.01); *A63F 2300/6081* (2013.01)

(58) Field of Classification Search
CPC .............. A63F 13/54; A63F 2300/6063; A63F 2300/6081; G06N 3/0475; G06N 3/08
USPC ............................................................ 463/35
See application file for complete search history.

(56) References Cited

U.S. PATENT DOCUMENTS

| | | | | |
|---|---|---|---|---|
| 10,585,472 | B2* | 3/2020 | Tokubo | A63F 13/53 |
| 11,653,167 | B2* | 5/2023 | Cappello | H04S 7/303 |
| | | | | 381/303 |
| 12,160,726 | B2* | 12/2024 | McCoy | H04N 21/4524 |
| 2014/0128160 | A1* | 5/2014 | Gillet | A63F 13/22 |
| | | | | 463/35 |
| 2023/0104514 | A1* | 4/2023 | Chen | A63F 13/92 |
| | | | | 340/691.5 |
| 2023/0285859 | A1* | 9/2023 | Zhou | A63F 13/54 |

* cited by examiner

*Primary Examiner* — Allen Chan
(74) *Attorney, Agent, or Firm* — Gray Ice Higdon (57) ABSTRACT

This specification relates to generating variations of in-game sound effects using machine-learned models. According to a first aspect of this specification, there is described a computer implemented method of training a machine-learned generative model to generate sound effect variations. The method comprises: for each of a plurality of training examples in a set of training examples, each training example comprising a waveform of a sound effect: generating a low dimensional representation of the waveform of the sound effect; inputting the waveform of the sound effect and the low-dimensional representation of the waveform of the sound effect into the generative model; processing, by the generative model, the input waveform of the sound effect and the low-dimensional representation of the waveform of the sound effect to generate a sample from an output distribution; and updating parameters of the generative model using an objective function based on a distribution of the input samples.

20 Claims, 5 Drawing Sheets

NEURAL SYNTHESIS OF SOUND EFFECTS USING DEEP GENERATIVE MODELS

FIELD

This specification relates to generating variations of in-game sound effects using machine-learned models.

BACKGROUND

Creating variations of sound effects for video games is a time-consuming task that grows with the size and complexity of the games themselves. The process usually comprises recording source material and mixing different layers of sounds to create sound effects that are perceived as diverse during gameplay.

A common way to create variations is to use procedural tools, which synthesize sound effects in real-time based on input parameters that define them. Determining the proper input parameters is not straightforward for designers and the quality of the sounds is inferior to hand-crafted sound variations.

SUMMARY

According to a first aspect of this specification, there is described a computer implemented method of training a machine-learned generative model to generate sound effect variations. The method comprises: for each of a plurality of training examples in a set of training examples, each training example comprising a waveform of a sound effect: generating a low dimensional representation of the waveform of the sound effect; inputting the waveform of the sound effect and the low-dimensional representation of the waveform of the sound effect into the generative model; processing, by the generative model, the input waveform of the sound effect and the low-dimensional representation of the waveform of the sound effect to generate a sample from an output distribution; and updating parameters of the generative model using an objective function based on a distribution of the input samples.

The objective function may be a log-likelihood function of a distribution of the training examples.

The low-dimensional representation of the waveform of the sound effect comprises a time-frequency representation. The time-frequency representation may comprise one or more mel spectrograms.

The method may further comprise: iterating the method over a set of training data comprising a plurality of sets of training examples until one or more threshold conditions are satisfied; and inverting the generative model to generate a trained machine-learned flow model for generating sound effect variations.

Updating parameters of the generative model may comprise applying an optimization routine to the objective function.

The plurality of training examples may each comprise a waveform of an in-game sound effect of the same type. The sound effect may be an explosion. The training dataset may comprise samples of explosions recorded under different conditions.

The generative model may be a flow model or a diffusion model.

According to a further aspect of this specification, there is described a computer implemented method of generating variations of a sound effect. The method comprises: sampling a set of noise from a noise distribution; receiving a waveform of an initial sound effect; generating a low-dimensional representation of the waveform of the initial sound effect; generating, using a machine-learned generative model, a waveform of a sound effect variation from the low-dimensional representation of the waveform and the set of random noise.

The low-dimensional representation may comprise a time-frequency representation of the waveform of the initial sound effect. The time-frequency representation may comprise one or more mel spectrograms.

The noise distribution may be a Gaussian distribution, such as an isotropic Gaussian distribution.

The initial sound effect may be of a first type, and wherein the generative model has been trained on a dataset of training examples comprising waveforms of sound effects of the first type.

The initial sound effect is of a first type, and wherein the generative model has been trained on a dataset of training examples comprising waveforms of sound effects of the second type, wherein the second type is different to the first type.

The method may further comprise outputting, from one or more audio devices, an in-game sound effect based on the waveform of the sound effect variation output by the machine-learned model.

The machine-learned generative model may be based on a normalised flow model or a diffusion model.

According to a further aspect of this specification, there is described a non-transitory computer-readable medium storing instructions that, when executed by one or more processors, causes the one or more processors to perform operation comprising: sampling a set of noise from a noise distribution; receiving a waveform of an initial sound effect; generating a low-dimensional representation of the waveform of the initial sound effect; generating, using a machine-learned generative model, a waveform of a sound effect variation from the low-dimensional representation of the waveform and the set of random noise.

The low-dimensional representation may comprise a time-frequency representation of the waveform of the initial sound effect. The time-frequency representation may comprise one or more mel spectrograms.

The noise distribution is a Gaussian distribution, such as an isotropic Gaussian distribution.

The machine-learned generative model may be based on a normalised flow model or a diffusion model.

DETAILED DESCRIPTION

This specification describes techniques for user-guided generation of high-quality, complex sound effects variation using machine-learned models, and the training of such models. A conditional machine-learned model, which may be based on a normalising flow concept, is used that allows users to generate variations similar to a given (non-speech) sound effect.

Figure 1:
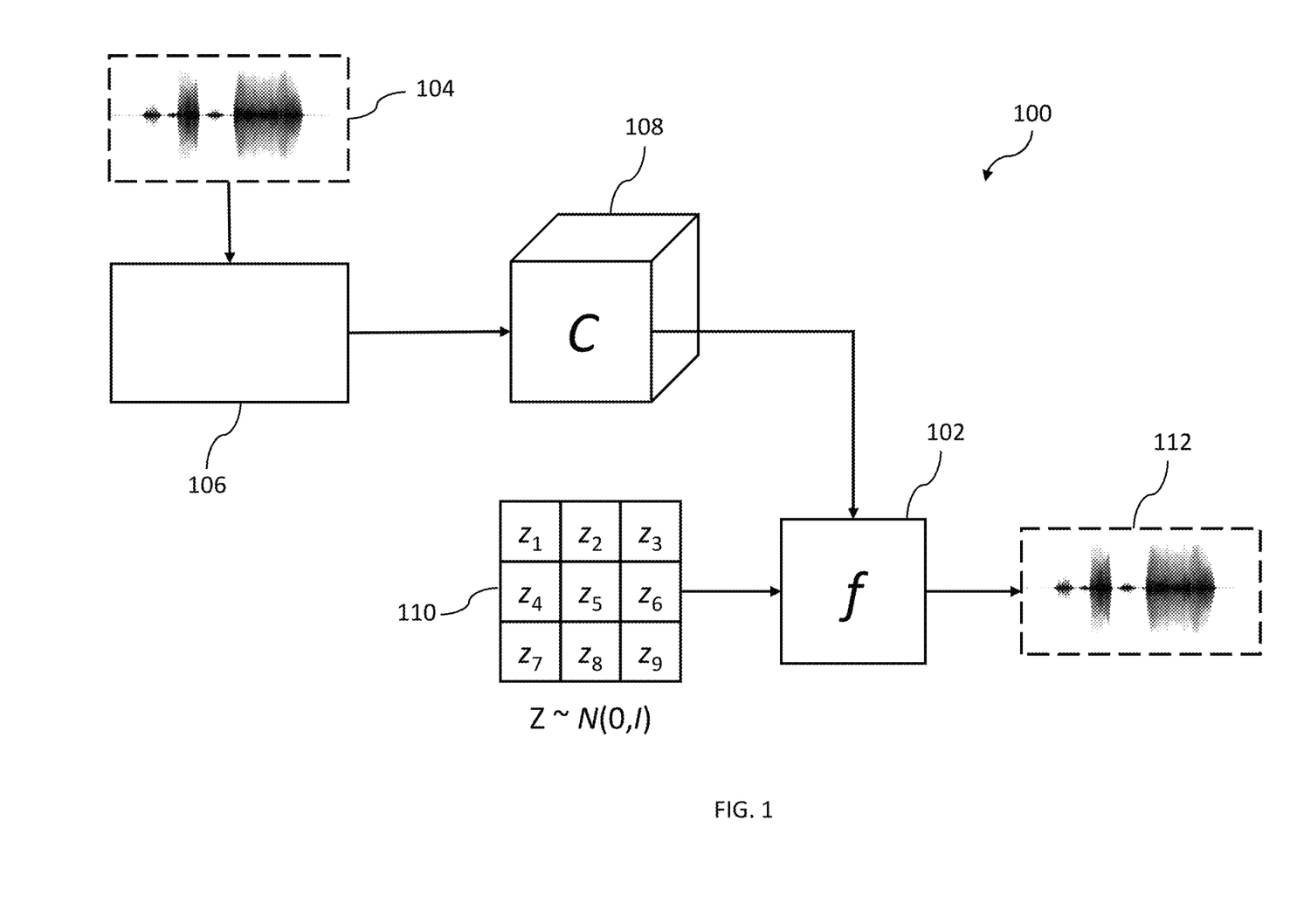
FIG. 1 shows an overview of an example method for generating variations of an in-game sound effect using a machine-learned model.

FIG. 1 shows an overview of an example method 100 for generating variations of an in-game sound effect 104 using a machine-learned model 102. The method 100 may be performed by one or more computers, operating in one or more locations. The method 100 may be performed in real-time during gameplay to generate sound variations on the fly. Alternatively, the method 100 may be performed in advance (e.g. during game development) to generate variations of a sound effect that are then stored for use in gameplay.

A waveform of an initial sound effect 104, x, is obtained from a library of sound effects. A low-dimensional representation, e.g. a time-frequency representation, 106 is generated from the waveform of an initial sound effect 104. In some implementations, the low-dimensional representation 106 may be reshaped into an input tensor 108, C. The low-dimensional representation 106 (or its reshaped input tensor 108) is input into a machine-learned model 102, e.g. a generative model, along with a sample of noise 110 taken from a noise distribution. The machine-learned model 102 processes the input low-dimensional representation 106 (or its reshaped input tensor 108) and noise 110 based on learned parameters of the machine-learned model 102 to generate a synthesised waveform 112 corresponding to a variation of the initial sound effect 104.

The waveform of the initial sound effect 104, x, may be in the form of a 1D waveform of length T, e.g. $x=x_{1:T}$. The initial sound effect 104 may be of a type of in-game sound effect that the machine-learned model 202 has been trained to generate variations of, e.g. if the machine-learned model 202 has been trained to generate variations of explosion sound effects, the initial sound effect 104 may be an example of an explosion. Alternatively, the initial sound effect 104 may be of a different type than the machine-learned model 202 has been trained to generate variations of, e.g. if the machine-learned model 202 has been trained to generate variations of explosion sound effects, the initial sound effect 104 may be an example of another sound effect, such as a drum beat or other percussive sound effect. In this manner, the machine-learned model 102 may be used for style transfer of sound effects.

In some implementations, the initial waveform 104 may be normalised to the range (−1, 1) prior to generation of the time-frequency representation 106.

The initial 104 and/or synthesised 112 sound effect may comprise: an explosion; one or more gunshots; an impact; an animal noise; one or more footsteps; a vehicle engine noise; and/or an ambient sound effect. Many other examples are possible.

The low-dimensional representation 106 of the initial sound effect waveform 104 is used as a conditioner by the machine-learned model 202. The low-dimensional representation 106 may be a time-frequency representation that encodes properties of the initial waveform 104 in a representation of the waveform 104 in the time-frequency domain. The time-frequency representation may be a spectrogram. An example of such a spectrogram is a mel spectrogram, though other examples may alternatively be used. A mel spectrogram is associated with a number of bands/channels (e.g. mel bands). The number of bands may be between 10 and 30. Better perceptual results may be obtained for some types of sound effects (e.g. explosions) when the number of bands is at least 15, though fewer bands may be sufficient for good results for other sound effects.

The low-dimensional representation 106 may be computed from the initial sound effect waveform 104 using a Short-time Fourier transform (STFT). The low-dimensional representation 106 may be converted to decibel scale. The low-dimensional representation 106 may be normalized to (0, 1).

Prior to input to the machine-learned model, the low-dimensional representation 106 may be reshaped into a tensor, $C \in \mathbb{R}^{h \times w \times c}$, where c is the number of bands in the time-frequency representation and h×w is the length (in samples) of the initial sound effect waveform 104. The parameter h controls the balance between parallel and sequential computations. h may be between 2 and 64, for example 16.

The sample of noise 110 may comprise a plurality of noise samples taken from the noise distribution. These may be reshaped into a matrix, $Z \in \mathbb{R}^{h \times w}$. The noise sample follows the noise distribution that the inverse of the machine-learned model 102 has been trained to reproduce, as described below in relation to FIG. 2. This may, for example, be an isotropic Gaussian distribution (IGD).

The machine-learned generative model 102 may be a flow model. Flow models work on the basis that the distribution of the data p(x) can be expressed as a transformation of a simpler distribution p(z) by a non-linear, invertible, and differentiable function x=f(z). In practice, $f=f_1, \ldots, f_N$ may be a chain of multiple simpler transformations. These may, in some implementations, be implemented using one or more neural networks (NNs).

An example of such a model is WaveFlow (see, for example, "WaveFlow: A compact flow-based model for raw audio". Ping et al., In International Conference on Machine Learning, 7706-7716. PMLR 2020, the contents of which are incorporated herein in its entirety), which presents a unified view on autoregressive and bipartite transformations. Autoregressive transformations can be trained in parallel, but inference is slow due to its dependency on all previous samples. On the other hand, bipartite transformations split the input. This allows both training and inference to be parallelizable but also reduces the expressivity of the flow since a part of the input is not transformed. WaveFlow reshapes the waveform into a 2D matrix where contiguous samples fall under the same column. This reshaping allows trading inference time and model capacity. Long-range dependencies are processed with convolutions and short-range local information with autoregressive functions over h, being able to compute w in parallel. Residual channels may be obtained from processing the aligned spectrogram via 1×1 convolutions and are added at each layer.

For example, the WaveFlow model may have the following parameters: h=16, 64 residual channels, and 8 flows of 8 layers. The dilation cycle of WaveNet may be set to d=[1, 2, 4, 8, 16, 32, 64, 128] and the kernel, k, may be set to 3 to provide a large receptive field that helps with long-range dependencies.

Other generative models may alternatively be used, such as a diffusion model, for example DiffWave ("DiffWave: A Versatile Diffusion Model for Audio Synthesis", arXiv: 2009:09761v1, the contents of which are incorporated herein by reference in their entirety). Alternatively, a variational autoencoder (VAE) or generative adversarial network (GAN) may be used. These may be conditioned on a low-dimensional representation of an example sound effect during the generation process.

The method 100 may be performed substantially in real-time in a computer game to generate sound effect variations during gameplay. In some implementations a GPU may be used for inference. In such implementations, and depending on the GPU used, sound effect generation may be performed approximately ten times faster than real-time at 16 KHz (e.g. ≈166667 samples/s). This means that a ten-second-long sound effect can be synthesized in less than one second. In some implementations a CPU may be used for inference. In CPU implementations, performance may be 1.1 times faster than real-time, e.g. ≈17544 samples/s at 16 KHz.

Alternatively or additionally, the method may be performed in advance of gameplay, for example during production, to generate a library of sound effect variations that may subsequently be used during gameplay.

The synthesised waveform 112 may undergo further processing (i.e. post-processing) prior to use in gameplay. For example, a naïve post-processing function may be applied that removes spiked and neighboring frequencies in the synthesised waveform 112. This post-processing may be performed on a complex STFT that allows a lossless reconstruction. Such a naïve approach can generate higher quality variations when compared to both no post-processing and more aggressive post-processing. Other post-processing techniques may alternatively or additionally be applied.

The input required for generation may thus be a vector sampled from a known distribution and a low-dimensional spectrogram from the sound to emulate. In effect, the network has learned to map the conditioner to the particular type of sounds exposed to during training, hallucinating the details missing in the spectrogram. In this way, it is possible to generate the desired type of sound effect by conditioning on a different one, as long as the spectrogram distributions are not too dissimilar.

Figure 2:
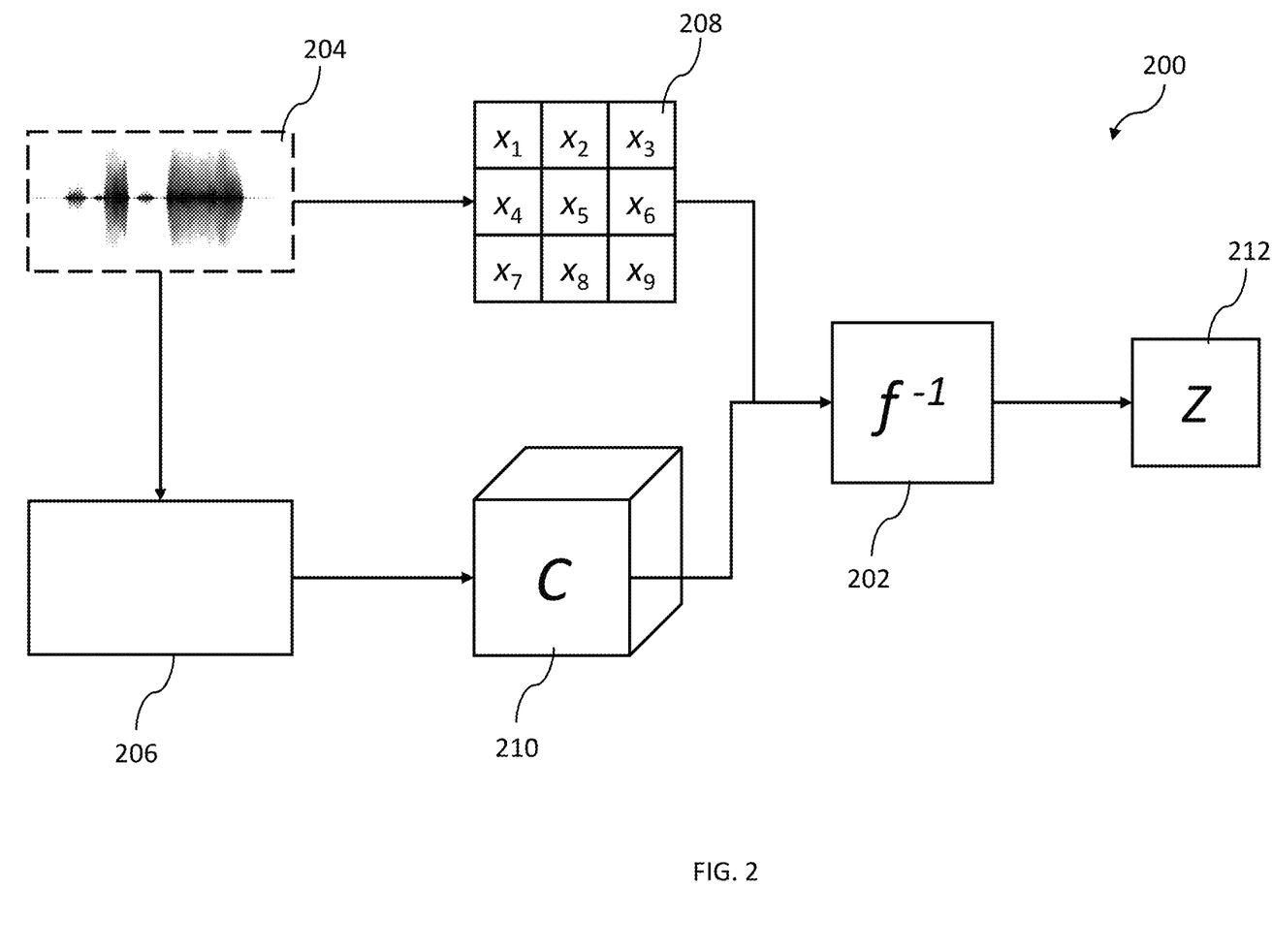
FIG. 2 shows an overview of an example method for training a machine-learned model for generating variations of an in-game sound effect.

FIG. 2 shows an overview of an example method 200 for training a machine learning model to find the inverse of the function that generates variations of an in-game sound effect. The method 200 may be performed by one or more computers, operating in one or more locations.

During training, a set of training examples 204 is taken from a training dataset of sound effects of a particular type. Each training example 204 comprises a waveform, x, of a sound effect of the particular type. A low dimensional time-frequency representation 206 of the waveform of training example 204 is generated from the waveform of the training example 204. In some implementations, the waveform of training example 204 and the low dimensional time-frequency representation 206 may be reshaped into an input waveform tensor 208 and an input low-dimensional representation tensor 210, respectively. The low dimensional time-frequency representation 206 and the corresponding waveform of the training example 204 (or their reshaped input tensors 208, 210) are input into an inverse machine-learning model 202, $f^{-1}$, which processes them according to current values of its parameters to generate a sample 212 from an output distribution, Z.

Once the set of training examples 204 have been processed (i.e. a sample 212 has been generated for each training example 204 in the set), the distribution of output samples 212 is compared to a target distribution. Parameters of the inverse machine-learning model 202 are updated based on the comparison. The comparison may be performed using an objective function. The objective function may be based on the distribution of the observed data, i.e. the input samples. The objective function may, for example, be a negative log-likelihood of the data, which can be computed in close form for certain distributions, such as Gaussian distributions. The likelihood is the probability of observing the data given the model (i.e. a measure of how well the model fits the data).

As an example, let X be the distribution of data to be learned (i.e. the distribution of sound effects) and Z be a base/target distribution, e.g. an isotropic normal distribution N (0, I). Then the goal is to learn a function, f, that maps z to x:

$$x = f(z)$$

$$z = f^{-1}(x)$$

The likelihood of a sample x can be written in terms of z as:

$$p(x) = p(z)\left|\det\left(\frac{\partial z}{\partial x}\right)\right| = p(f^{-1}(x))\left|\det\left(\frac{\partial f^{-1}(x)}{\partial x}\right)\right|$$

Training, or learning the parameters, Θ, of the function, may be done using a maximum likelihood function:

$$\max_{\Theta} \sum_{i=0}^{N} \log p(f^{-1}(x_i \mid \theta)) + \log\left|\det\left(\frac{\partial f^{-1}(x_i \mid \Theta)}{\partial x_i}\right)\right|$$

where $x_i$ are each of the elements in the dataset. In implementations where a diffusion model is used, an unweighted variant of the ELBO may be used (see, for example, "DiffWave: A Versatile Diffusion Model for Audio Synthesis", arXiv:2009.09761v1).

The training process 200 may be iterated over the training dataset until a threshold condition is satisfied. The threshold condition may, for example, comprise a predefined number of training epochs or iterations. The number of training iterations may be between ten thousand and two hundred thousand. Alternatively or additionally, the threshold condition may be a threshold performance being reached on a validation dataset, as measured by a metric.

The method 200 learns the invertible function $f^{-1}$ (the inverse machine-learned model) that approximates a conditional distribution of the sound effect given the time-frequency representation to a target distribution, e.g. an isotropic Gaussian distribution (IGD). Once trained, the inverse machine-learning model 202 is inverted to give a machine-learned model that can generate variations of sound effects based on a noise sample, conditioned on a low-dimensional representation of a sound effect, i.e. the machine-learned model of FIG. 1.

The training examples 204 each comprise a sound effect of a particular type (e.g. explosions, gunshots, impacts, etc.) recorded under some conditions. The same sound effect may be recorded under multiple conditions, e.g. the same sound effect recorded at different distances. The training examples may be labelled based on the conditions they are recorded in, e.g. size, location, and distance. These features may take a predetermined number of values each, e.g. three. For example, the location may be "field", "indoors" or "urban", the size may be "small", "medium" or "large", and/or the distance may be "near", "middle distance" or "distant".

The training examples 204 may have different lengths, e.g. fluctuate between 1.5-10 s. In some implementations, the training examples 204 may be padded with zeros so that they all have a fixed length. Alternatively, the first n seconds of each sample may be taken, where n is equal to or smaller than the shortest sample length. For example, only the first second of the samples may be used, which always contain the transient, the body, and at least part of the tail of a short sound effect (e.g. an explosion or gunshot). Alternatively or additionally, during training, random segments of samples from each audio sample, per iteration may be selected, e.g. 14 k samples per audio sample, per iteration.

The dataset may be split randomly into training and test subsets, for example, 90% training and 10% testing. In some implementations, in order to augment the dataset, the sound effects may be converted to mono, and both channels used as different samples. The audio may be downsampled to allow fast iteration, e.g. from 48 kHz to 16 KHz. The waveform of the training examples 204 may be normalized to the range (−1, 1). The time-frequency representation may be computed from the normalized waveform using the Short-time Fourier transform (STFT) and converted to a decibel scale. Then, it may be normalized to (0, 1).

The inverse model 202 may be a flow model. Flow models assume that the distribution of the data p(x) can be expressed as a transformation of a simpler distribution p(z), e.g. an IGD, by a non-linear, invertible, and differentiable function x=f(z). An example of such a model is WaveFlow, as described above in relation to FIG. 1.

The comparison of the distribution of output samples 212 to the target distribution may be performed using an objective function, such as a log-likelihood function. In some implementations, the change of variable formula may allow for exact optimisation of the log-likelihood function via:

$$p(x) = p(f^{-1}(x)) \left| \det\left(\frac{\partial f^{-1}(x)}{\partial x}\right) \right|$$

An optimisation routine may be applied to the objective function to determine the updates to the flow model. The optimisation routine may be based on stochastic gradient descent. The optimisation routine may, for example, use the ADAM optimiser. The batch size may, for example, be between 5 and 10, e.g. 8. The batch size may depend on the hardware being used, e.g. the type and number of GPUs. The learning rate may be between 1e-4 and 5e-4, e.g. 2e-4. The network may be trained using Apex mixed precision library (NVIDIA 2018), which may increase training speed by employing 16-bit floating point operations.

The training process may be iterated for a predetermined number of iterations, e.g. between ten thousand and two-hundred thousand iterations.

Figure 3:
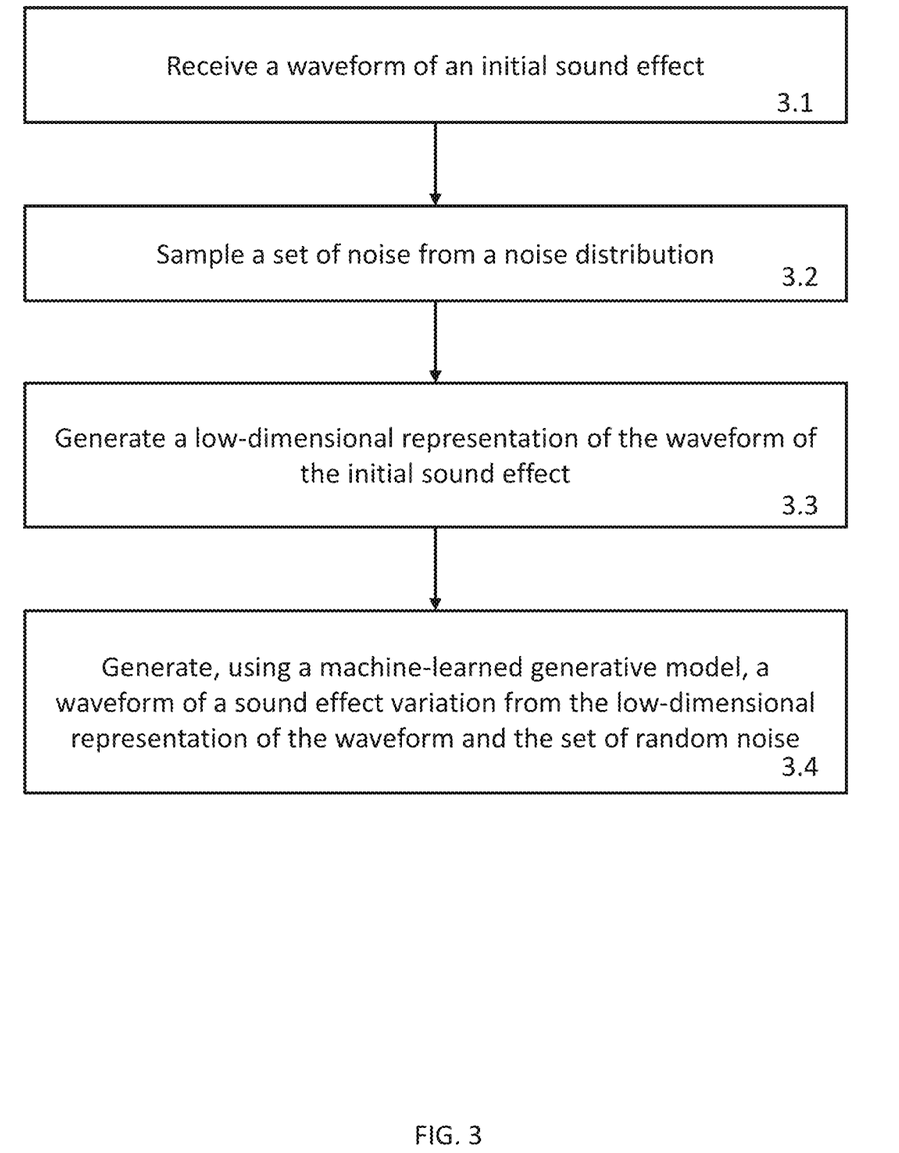
FIG. 3 shows a flow diagram of an example method for generating variations of a sound effect.

FIG. 3 shows a flow diagram of an example method for generating variations of a sound effect. The method may be performed by one or more computers operating in one or more locations. The method may be performed in real-time during gameplay in order to generate sound effects for use in a computer game.

At operation 3.1, a waveform of an initial sound effect is received. The waveform may be taken from a library of sound effects, or input manually by a user. The waveform may be a 1D waveform of T samples taken at a predetermined sampling frequency, e.g. 16 Hz.

At operation 3.2, one or more sets of noise are sampled from a noise distribution. The noise distribution may be a Gaussian distribution, such as an isotropic Gaussian Distribution (IGD). Where the set of noise comprises a plurality of noise samples, the set of nose samples may be reshaped into an h×w matrix prior to input into the machine-learned model, where h×w is the number of samples in the input waveform.

At operation 3.3, a low-dimensional representation of the initial sound effect is generated from the received waveform. The low-dimensional representation may be a time-frequency representation. The time-frequency representation may be a spectrogram, such as a mel spectrogram. The spectrogram may have between 10 and 30 bands, e.g. at least 15 bands. Prior to input to the machine-learned model, the time-frequency representation may be reshaped into a tensor of size h×w×c, where c is the number of bands of the time-frequency representation. This tensor may, in some embodiments, be combined with the h×w sized noise matrix At operation 3.4, a waveform of a sound effect variation is generated from the time-frequency representation of the initial sound effect and the sampled noise using a machine-learned model. The noise sample and time-frequency representation are input into the machine-learned model, which processes them according to a set of learned parameters to generate an output waveform of the sound effect variation. The machine-learned model may be a flow model, such as WaveFlow. The machine-learned model may have been trained according to methods described in relation to FIGS. 2 and 4.

The output waveform may undergo post-processing in the complex STFT domain to remove spiked and neighboring frequencies.

The generated sound effect variation may be output during gameplay in a computer game. This may occur in real-time as the sound effect is generated. Alternatively, the generated sound effect variation may be stored in a library of sound effects for later retrieval and use during gameplay.

Figure 4:
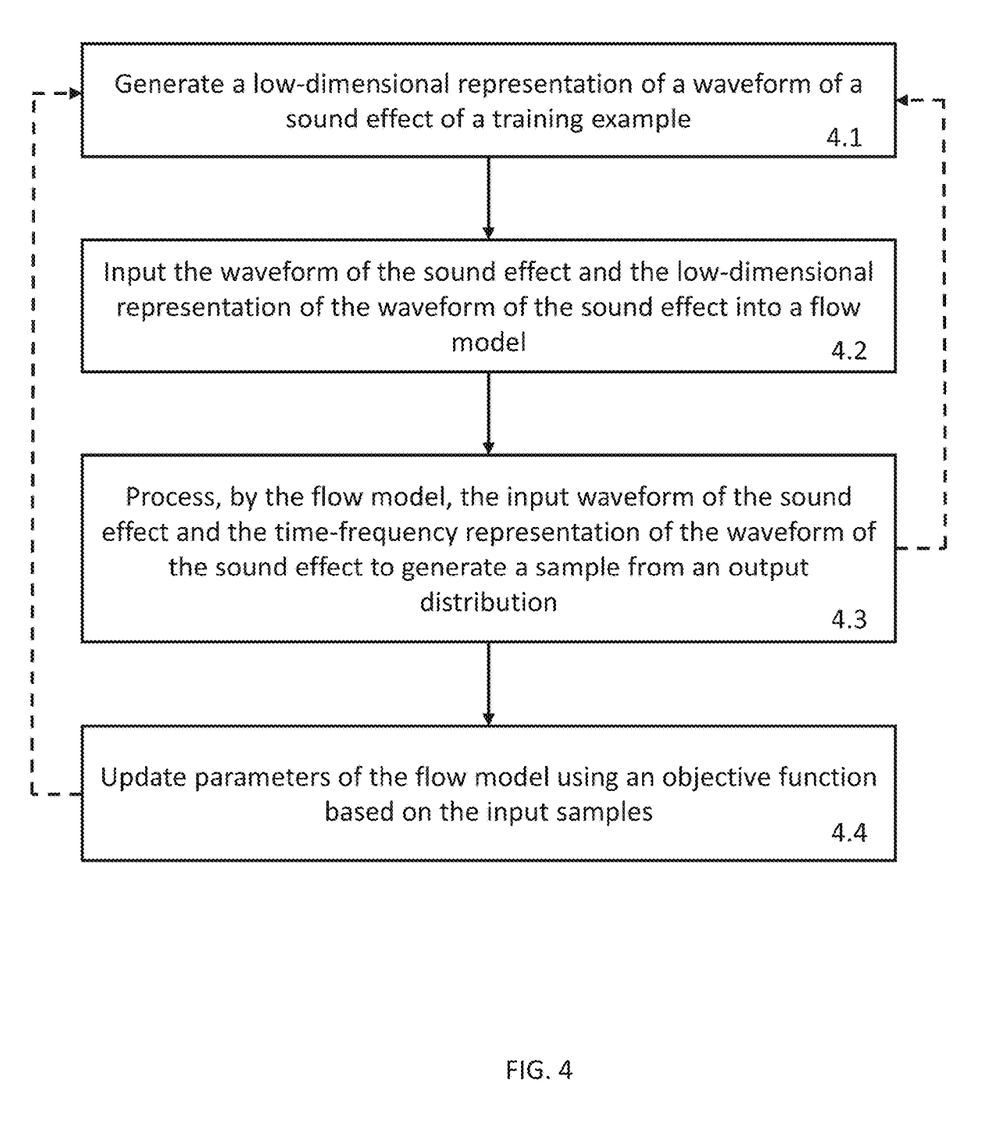
FIG. 4 shows a flow diagram of an example method for training a machine-learned model to generate variations of a sound effect.

FIG. 4 shows a flow diagram of an example method for training a machine-learned model to generate variations of a sound effect. The method may be performed by one or more computers operating in one or more locations.

A set of training examples comprising a plurality of training examples is obtained from a training dataset. Each training example comprising a waveform of a sound effect corresponding to a sound effect type that the machine-learned model is being trained to generate variations of. The sound effects may be labelled with a set of conditions under which they were captured, e.g. distance from source of sound effect, environment etc.

At operation 4.1, a low-dimensional representation of the waveform of the sound effect of a training example is generated. The low-dimensional representation may be a time-frequency representation. The time-frequency representation may be generated using a windowed Fourier transform. The time-frequency representation may be a spectrogram, such as a mel spectrogram. The spectrogram may have between 10 and 30 bands, e.g. at least 15 bands.

At operation 4.2, the waveform of the sound effect of the training example and the time-frequency representation of the waveform of the sound effect are input into a generative model. The generative model may be a flow model, such as WaveFlow, or a diffusion model.

Prior to input into the generative model, the input waveform, x, may be reshaped into a h×w matrix, $X \in \mathbb{R}^{h \times w}$. Contiguous samples may fall under the same column. The time-frequency representation may be reshaped into a h×w×c matrix, $C \in \mathbb{R}^{h \times w \times c}$, where c is the number of channels of the time-frequency representation. In some implementations, the low-dimensional representation may be up-sampled to have the same length as the input waveform. The matrix X and the tensor C may be combined into a single input tensor of size h×w×(c+1) prior to input into the generative model, or may be input separately.

At operation 4.3, the input waveform of the sound effect from the training example and the low-dimensional representation of the waveform of the sound effect are processed by a generative model to generate an output sample from an output distribution. The generative model may be a parameterised invertible function, i.e. $f^{-1}$. It may, for example, comprise a chain of functions that may be implemented as a neural network. In some implementations, the generative model may be a flow model with h=16, 64 residual layers and 8 flows of 8 layers. The generative model processes its input based on current values of its parameters.

Operations 4.1 to 4.3 are repeated for each training example in the set of training examples to generate a set of samples from the output distribution.

At operation 4.4, parameters of the flow model are updated using an objective function based on the output samples and a distribution of the input data. The comparison may be performed using a log-likelihood function. An optimisation routine may be applied to the objective function used to determine the updates. The optimisation routine may, for example, be a stochastic gradient descent/ascent-based method. In some implementations, the ADAM optimiser may be used.

At a high level, the objective function compares the distribution of the output samples to a target distribution. The target distribution may be a Gaussian distribution, such as an isotropic Gaussian distribution N (0, I).

Operations 4.1 to 4.4 may be iterated over the training dataset. The number of iterations may be between ten thousand and two-hundred thousand, e.g. [10, 20, 50, 100, 200] K iterations.

Once trained, the flow model may be inverted to obtain the model to be used for inference (i.e. the generation of the sound effect variations from noise and time-frequency representation, as described above in relation to FIGS. 1 and 3).

Figure 5:
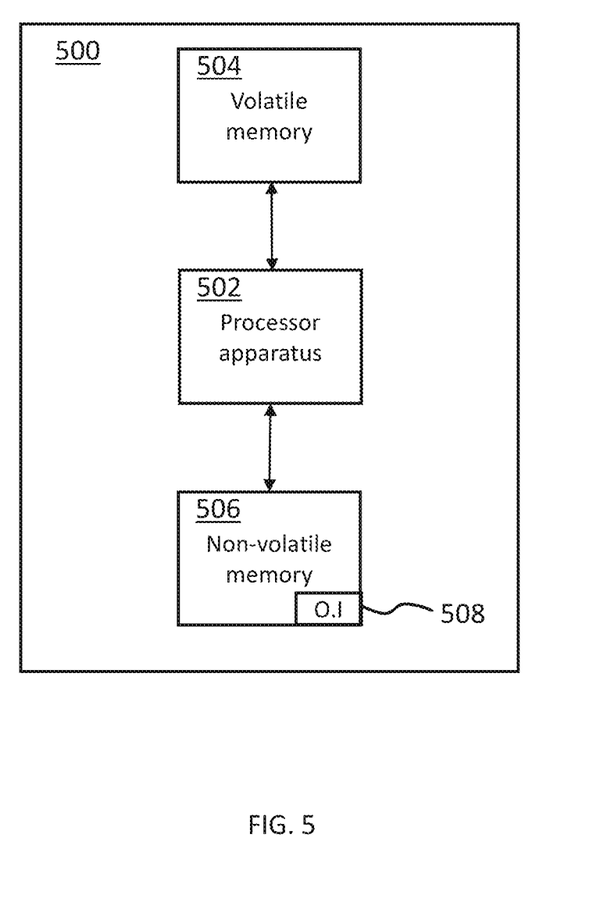
FIG. 5 shows a schematic overview of a computing system for performing any of the methods described herein.

FIG. 5 shows a schematic overview of a computing system 500 for performing any of methods described herein. The system/apparatus shown is an example of a computing device. It will be appreciated by the skilled person that other types of computing devices/systems may alternatively be used to implement the methods described herein, such as a distributed computing system.

The apparatus (or system) 500 comprises one or more processors 502. The one or more processors control operation of other components of the system/apparatus 500. The one or more processors 502 may, for example, comprise a general purpose processor. The one or more processors 502 may be a single core device or a multiple core device. The one or more processors 502 may comprise a central processing unit (CPU) or a graphical processing unit (GPU). Alternatively, the one or more processors 1102 may comprise specialized processing hardware, for instance a RISC processor or programmable hardware with embedded firmware. Multiple processors may be included.

The system/apparatus comprises a working or volatile memory 504. The one or more processors may access the volatile memory 504 in order to process data and may control the storage of data in memory. The volatile memory 504 may comprise RAM of any type, for example Static RAM (SRAM), Dynamic RAM (DRAM), or it may comprise Flash memory, such as an SD-Card.

The system/apparatus comprises a non-volatile memory 506. The non-volatile memory 506 stores a set of operation instructions 508 for controlling the operation of the processors 502 in the form of computer readable instructions. The non-volatile memory 506 may be a memory of any kind such as a Read Only Memory (ROM), a Flash memory or a magnetic drive memory.

The one or more processors 502 are configured to execute operating instructions 508 to cause the system/apparatus to perform any of the methods described herein. The operating instructions 508 may comprise code (i.e. drivers) relating to the hardware components of the system/apparatus 500, as well as code relating to the basic operation of the system/apparatus 500. Generally speaking, the one or more processors 502 execute one or more instructions of the operating instructions 508, which are stored permanently or semi-permanently in the non-volatile memory 506, using the volatile memory 504 to temporarily store data generated during execution of said operating instructions 508.

Implementations of the methods described herein may be realized as in digital electronic circuitry, integrated circuitry, specially designed ASICs (application specific integrated circuits), computer hardware, firmware, software, and/or combinations thereof. These may include computer program products (such as software stored on e.g. magnetic discs, optical disks, memory, Programmable Logic Devices) comprising computer readable instructions that, when executed by a computer, such as that described in relation to FIG. 5, cause the computer to perform one or more of the methods described herein.

Any system feature as described herein may also be provided as a method feature, and vice versa. As used herein, means plus function features may be expressed alternatively in terms of their corresponding structure. In particular, method aspects may be applied to system aspects, and vice versa.

Furthermore, any, some and/or all features in one aspect can be applied to any, some and/or all features in any other aspect, in any appropriate combination. It should also be appreciated that particular combinations of the various features described and defined in any aspects of the invention can be implemented and/or supplied and/or used independently.

Although several embodiments have been shown and described, it would be appreciated by those skilled in the art that changes may be made in these embodiments without departing from the principles of this disclosure, the scope of which is defined in the claims.

It should be understood that the original applicant herein determines which technologies to use and/or productize based on their usefulness and relevance in a constantly evolving field and what is best for it and its players and users. Accordingly, it may be the case that the systems and methods described herein have not yet been and/or will not later be used and/or productized by the original applicant. It should also be understood that implementation and use, if any, by the original applicant, of the systems and methods described herein are performed in accordance with its privacy policies. These policies are intended to respect and prioritize player privacy, and to meet or exceed government and legal requirements of respective jurisdictions. To the extent that such an implementation or use of these systems and methods enables or requires processing of user personal information, such processing is performed (i) as outlined in the privacy policies; (ii) pursuant to a valid legal mechanism, including but not limited to providing adequate notice or where required, obtaining the consent of the respective user; and (iii) in accordance with the player or user's privacy settings or preferences. It should also be understood that the original applicant intends that the systems and methods described herein, if implemented or used by other entities, be in compliance with privacy policies and practices that are consistent with its objective to respect players and user privacy.

The invention claimed is:

1. A computer implemented method of generating variations of a sound effect, the method comprising:
sampling a set of random noise from a noise distribution;
receiving a waveform of an initial sound effect;
generating a low-dimensional representation of the waveform of the initial sound effect; and
generating, using a machine-learned generative model, a waveform of a sound effect variation from the low-dimensional representation of the waveform of the initial sound effect and the set of random noise.

2. The method of claim 1, wherein the low-dimensional representation of the waveform of the initial sound effect comprises a time-frequency representation of the waveform of the initial sound effect.

3. The method of claim 2, wherein the time-frequency representation of the waveform of the initial sound effect comprises one or more mel spectrograms.

4. The method of claim 1, wherein the noise distribution is a Gaussian distribution.

5. The method of claim 1, wherein the initial sound effect is of a first type, and wherein the machine-learned generative model has been trained on a dataset of training examples comprising waveforms of sound effects of the first type.

6. The method of claim 1, wherein the initial sound effect is of a first type, and wherein the machine-learned generative model has been trained on a dataset of training examples comprising waveforms of sound effects of the second type, wherein the second type is different to the first type.

7. The method of claim 1, further comprising outputting, from one or more audio devices, an in-game sound effect based on the waveform of the sound effect variation output by the machine-learned generative model.

8. The method of claim 1, wherein the machine-learned generative model is based on a normalised flow model or a diffusion model.

9. A non-transitory computer-readable medium storing instructions that, when executed by one or more processors, causes the one or more processors to perform operation comprising:
sampling a set of random noise from a noise distribution;
receiving a waveform of an initial sound effect;
generating a low-dimensional representation of the waveform of the initial sound effect; and
generating, using a machine-learned generative model, a waveform of a sound effect variation from the low-dimensional representation of the waveform of the initial sound effect and the set of random noise.

10. The non-transitory computer-readable medium of claim 7, wherein the low-dimensional representation of the waveform of the initial sound effect comprises a time-frequency representation of the waveform of the initial sound effect.

11. The non-transitory computer-readable medium of claim 9, wherein the noise distribution is a Gaussian distribution.

12. The non-transitory computer-readable medium of claim 9, wherein the machine-learned generative model is based on a normalised flow model or a diffusion model.

13. The non-transitory computer-readable medium of claim 9, wherein a time-frequency representation of the waveform of the initial sound effect comprises one or more mel spectrograms.

14. The non-transitory computer-readable medium of claim 9, wherein the operations further comprise outputting, from one or more audio devices, an in-game sound effect based on the waveform of the sound effect variation output by the machine-learned generative model.

15. A system comprising:
one or more processors; and
a memory storing computer readable instructions that, when executed by the one or more processors, causes the system to perform operations comprising:
sampling a set of random noise from a noise distribution;
receiving a waveform of an initial sound effect;
generating a low-dimensional representation of the waveform of the initial sound effect; and
generating, using a machine-learned generative model, a waveform of a sound effect variation from the low-dimensional representation of the waveform of the initial sound effect and the set of random noise.

16. The system of claim 15, wherein the low-dimensional representation of the waveform of the initial sound effect comprises a time-frequency representation of the waveform of the initial sound effect.

17. The system of claim 15, wherein the time-frequency representation of the waveform of the initial sound effect comprises one or more mel spectrograms.

18. The system of claim 15, wherein the noise distribution is a Gaussian distribution.

19. The system of claim 15, wherein the machine-learned generative model is based on a normalized flow model or a diffusion model.

20. The system of claim 15, wherein the operations further comprise outputting, from one or more audio devices, an in-game sound effect based on the waveform of the sound effect variation output by the machine-learned generative model.

* * * * *